United States Patent [19]

Winninger

[11] Patent Number: 5,792,018
[45] Date of Patent: Aug. 11, 1998

[54] POWER TRANSMISSION BELT

[75] Inventor: Alain Winninger, Tours, France

[73] Assignee: Hutchinson, Paris, France

[21] Appl. No.: 896,637

[22] Filed: Jul. 18, 1997

Related U.S. Application Data

[63] Continuation of Ser. No. 542,183, Oct. 12, 1995.

[30] Foreign Application Priority Data

Oct. 20, 1994 [FR] France ............... 94 12542

[51] Int. Cl.⁶ .................................................. F16G 1/10
[52] U.S. Cl. ............................................................. 474/260
[58] Field of Search ............................. 474/202, 237, 474/260, 273

[56] References Cited

U.S. PATENT DOCUMENTS

| | | | |
|---|---|---|---|
| 2,112,525 | 3/1938 | Foster | 57/902 |
| 3,656,359 | 4/1972 | Dorf. | |
| 4,414,047 | 11/1983 | Wetzel et al. | |
| 4,421,439 | 12/1983 | Ter Burg et al. | 405/258 |
| 4,739,814 | 4/1988 | Berczi et al. | 152/527 |
| 4,822,324 | 4/1989 | Georget. | |

FOREIGN PATENT DOCUMENTS

| | | | |
|---|---|---|---|
| 2610056 | 1/1987 | France. | |
| 63-246530 | 10/1988 | Japan. | |
| 3-255244 | 11/1991 | Japan | 474/260 |

OTHER PUBLICATIONS

Patent Abstracts of Japan, vol. 1, No. 74 (M-026), Jul. 16, 1977 and JP-A-52 21549 (UNITTA KK), Feb. 18, 1977, Abstract.

Patent Abstracts of Japan, vol. 13, No. 36 (M-790), Jan. 26, 1989 and JP-A-3 246530 (Bando Chem.), Oct. 13, 1988, Abstract.

*Primary Examiner*—Tamara L. Graysay
*Assistant Examiner*—Gary S. Hartmann
*Attorney, Agent, or Firm*—Dickinson Wright PLLC

[57] ABSTRACT

The belt of the invention includes reinforcement formed by at least one ply of turns of cords, in which the different turns of cords are disposed in alternation, to improve the vibration behavior of the belt, in particular.

12 Claims, 2 Drawing Sheets

POWER TRANSMISSION BELT

This is a continuation of U.S. application Ser. No. 08/542,183, filed Oct. 12, 1995.

BACKGROUND OF THE INVENTION

A belt of this type may be trapezium-shaped or it may be formed with parallel ribs on the inside surface and it includes a reinforcement of cords wound in turns that are more or less spaced apart and embedded in the rubber or in the elastomer of the belt, said cords transmitting force between a driving pulley and one or more driven pulleys.

The rotation speeds of the pulleys can be relatively high and they are often variable. In practice, it is frequently observed that the sides of the belts, i.e. the portions of the belt extending between two pulleys or rollers, begin to vibrate at certain pulley rotation speeds or over more or less broad ranges of rotation speeds, and said vibrations can generate noise and provoke premature wear of the belts, and can reduce their service life.

Numerous solutions to that problem have already been proposed, generally consisting in modifying the shape and composition of the belts in order to modify their vibration behavior which depends to a large extent on the choice and the disposition of the cords.

The cords and the cord dispositions which are capable of providing the best results have thus been selected, not only with regard to the vibration behavior of belts, but also with regard to power transmission capacity and service life.

Belts have already been proposed, for example in patent applications JP-A-52021549 and JP-A-63246530, including turns of two cords of different natures in order to improve dimensional stability, resistance to bending fatigue, or transmission capacity of the belts. The use of two juxtaposed groups of different cords has also been proposed in U.S. Pat. No. 3,656,359 in order to attempt to make stress distribution uniform in a belt of asymmetric cross-section.

However, cases always exist where belts vibrate and generate noise at certain rotation speeds or in certain ranges of rotation speeds, in particular on sides that are relatively very short or relatively very long, and the solutions proposed so far, which tend to increase the power transmission and the service life of belts, do not enable their vibration behavior to be improved.

OBJECTS AND SUMMARY OF THE INVENTION

An object of the present invention is to resolve that problem in a simple and efficient way.

It seeks to provide a power transmission belt which, when vibrating, behaves better than present belts and which also has a service life that is not less than that of present belts.

The invention provides a power transmission belt comprising turns of cords of different natures embedded in the constituent material of the belt and disposed in alternation, wherein the above-mentioned cords have different vibration damping and fatigue resistance characteristics, some having better vibration behavior and the others better resistance to fatigue.

In a surprising but very efficient and advantageous manner, the invention allows the advantages presented by the different types of cord to be combined, thereby avoiding or reducing their drawbacks.

Thus, in particular, associating a cord having good vibration behavior and average resistance to fatigue with a cord having average vibration behavior but good resistance to fatigue, enables a belt to be produced which has both good vibration behavior and long service life.

In a preferred embodiment of the invention, the belt comprises two cords of different natures having turns which alternate 1:1, one turn of one cord being disposed between two turns of the other cord and vice versa.

In a variant, the turns of the cords can alternate differently, where a group of adjacent turns of one cord is disposed between two groups of turns of another cord and vice versa, the number of turns per group being identical or different for the different cords.

BRIEF DESCRIPTION OF THE DRAWINGS

The invention will be better understood, and other characteristics, details and advantages thereof will appear more clearly on reading the following description, given by way of example, and with reference to the accompanying drawings.

MORE DETAILED DESCRIPTION

Figure 1:
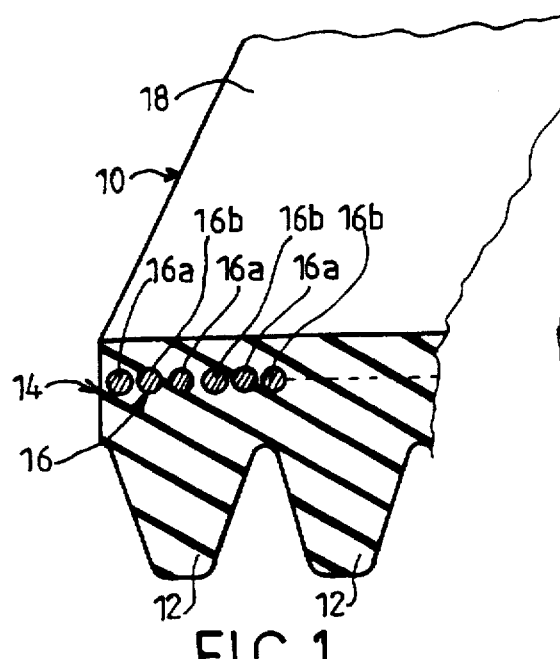
FIG. 1 is a cross-sectional perspective view of a portion of the belt of the invention.
Figure 2:
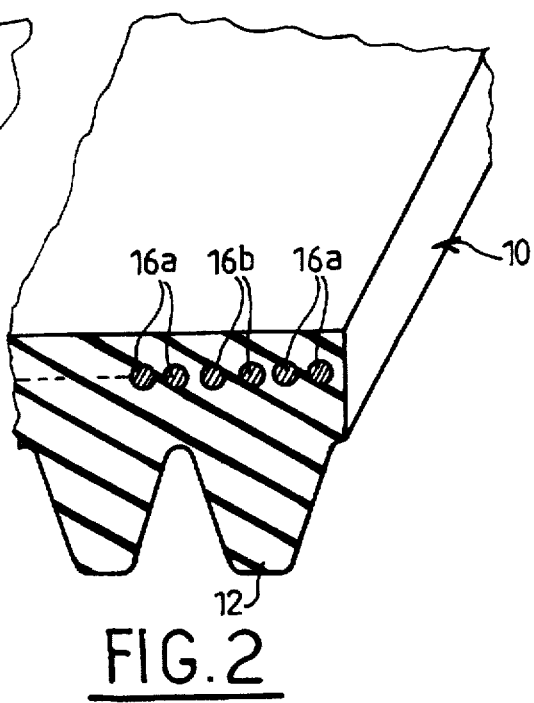
FIG. 2 is a cross-sectional perspective view of a portion of the belt of the invention.
Figure 3:
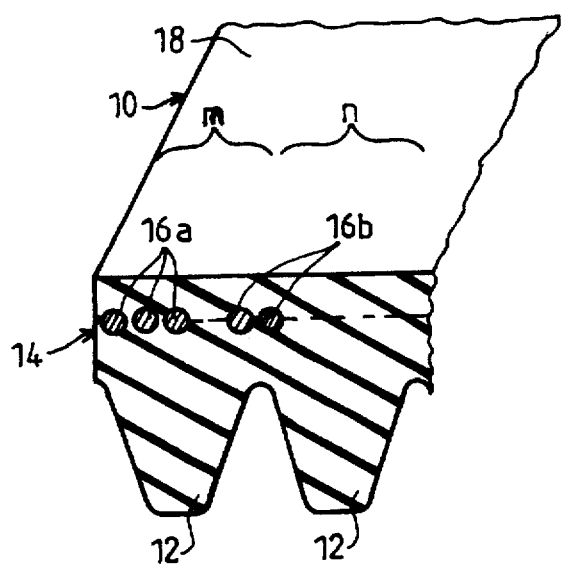
FIG. 3 is a cross-sectional perspective view of a portion of the belt of the invention.

As shown in FIGS. 1–3, the belt 10, which is designed for example to be mounted on a motor vehicle engine for rotating various rotary members such as a pump, an alternator, etc., is of the fluted type and comprises on its inside surface a certain number of circumferential flutes 12 which are trapezium-shaped in cross-section, the flutes 12 being parallel to each other and extending along the entire belt, and being designed to be engaged in grooves of corresponding shape of the pulleys on which said belt is mounted.

The belt 10 comprises at least one ply 14 of cords 16 which are embedded in the constituent elastomer or rubber of the belt 10 at a small distance from the outside surface 18 of said belt, the cords 16 being spirally wound in order to form turns in the belt which are more or less adjacent to one another, the number of turns across the width of the belt being a function of the mechanical characteristics desired for said belt.

In the invention, at least two different cords are used to form the turns of the ply 14, and the different turns of the cords are organized in alternation.

For example, and as shown in FIG. 1, a turn of a cord 16a is situated between two turns of another cord 16b and vice versa, a turn of the cord 16b is situated between two turns of the cord 16a. In order to achieve this, cord 16a and cord 16b can be placed side by side and wound simultaneously onto a layer of rubber or elastomer during the manufacture of the belt.

It is also possible, as shown in FIG. 2, to have two adjacent turns of cord 16b lying between two groups of two turns of cord 16a, and vice versa, two adjacent turns of cord 16a lying between two groups of two adjacent turns of cord 16b.

As shown in FIG. 3, it is also possible to have a configuration in which the number of turns of one cord is greater than the number of turns of the other cord: for example, a configuration formed by the repetition of a group of three consecutive turns comprising a turn of a cord 16a and two successive turns of a cord 16b.

In general, it is possible to have m consecutive turns of a cord 16a disposed between two groups of n consecutive turns of another cord 16b, m and n being integers greater than 1.

For reasons of belt conformability, it is desirable for the numbers m and n not to be too great.

Figure 4:
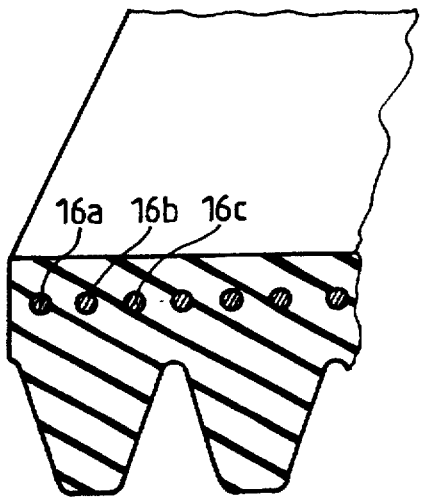
FIG. 4 is another embodiment of the belt of the invention.

More than two different cords can also be used to form the ply 14 of the belt 10, the turns of the different cords being disposed in alternation. It is thus possible to have, for example, groups of three successive turns of three different cords 16a, 16b and 16c, see FIG. 4.

In a particular aspect of the invention, the different cords designed to constitute the reinforcement of the belt are selected as a function of their properties for damping vibrations and of resistance to dynamic fatigue. Cords of polyester thread can be associated, for example, with cords of polyamide thread and/or with cords of aramid thread.

Cords of polyester thread enable belts to be manufactured which have good mechanical properties and good resistance to dynamic fatigue. However, said belts have unsatisfactory vibration behavior, particularly when the lengths of the belt between pulleys are relatively very short or relatively very long.

Cords of aramid thread enable belts to be made which have good vibration behavior but bad resistance to dynamic fatigue, and thus a short service life.

Figure 5:
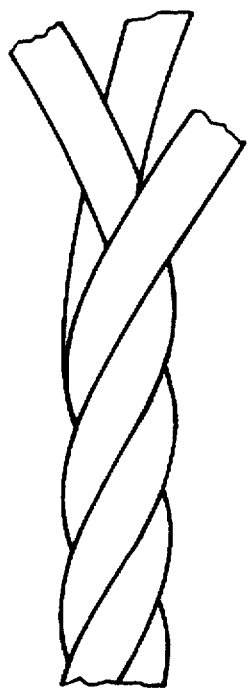
FIGS. 5–8 show four different cords types for use with the belt of the invention.
Figure 7:
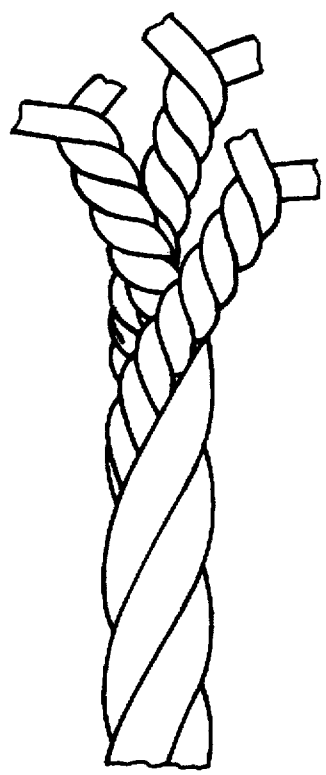
Figure 8:
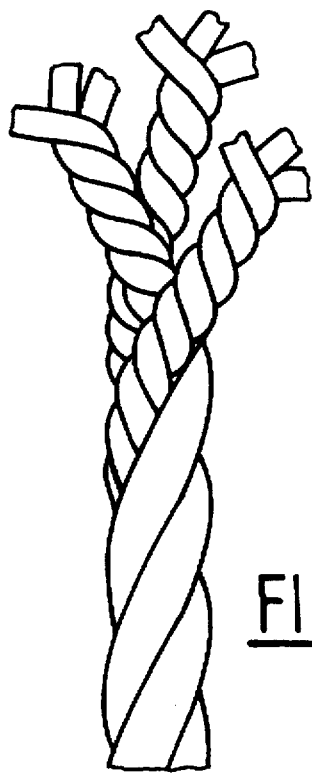

However, belts comprising alternate turns of cords of polyester thread and of aramid thread have good vibration behavior, good resistance to dynamic fatigue, and long service life. In particular, belts have been made comprising alternate turns of cord of polyester thread of the 1100×2×3 type, see FIG. 7 (cord formed by three groups of two unitary threads of 1100 decitex) or of the 1100×3×3 type, see FIG. 8 (cord formed by three groups of three unitary threads of 1100 decitex), and of cord of aramid thread, for example, of the 1680×1×3 type, see FIG. 5 (cord formed by three unitary threads of 1680 decitex). Tests results on said belts reveal an excellent vibration behavior and very good resistance to dynamic fatigue.

Figure 6:
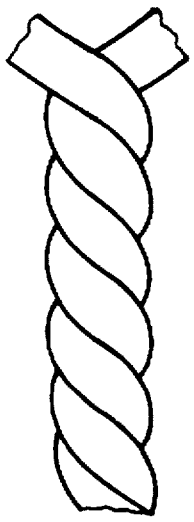

The vibration behavior of a belt can also be clearly improved by using alternate turns of a cord of polyester thread, for example of the 1100×2×3 type, and of a cord of polyamide thread of the 940×1×2 type, see FIG. 6.

In general, belts of the invention represent a considerable improvement over the prior art, because they benefit from the advantages of the different cords used to make up their reinforcement without being subject to the drawbacks of said cords.

I claim:

1. A power transmission belt comprising turns of cords of different natures embedded in the material of the belt and disposed in alternation, these cords cooperating in the belt for a power transmission, wherein for improving the vibration damping and fatigue resistance characteristics of the belt, some of the cords are made of polyester threads and have a better resistance to fatigue than the other cords of the belt and the other cords are made of threads selected from the group consisting of aramid threads and polyamide threads and have better vibration damping characteristics than the cords of polyester threads.

2. A belt according to claim 1, wherein the turns of cords alternate 1:1, one turn of one cord being disposed between two turns of another cord and one turn of said another cord being disposed between two turns of said one cord.

3. A belt according to claim 1, wherein the turns of the cords alternate so that a group of consecutive turns of a first cord is disposed between two groups of consecutive turns of another cord and a group of consecutive turns of said another cord is disposed between two groups of said first cord, the number of turns per group being identical for the two cords or different.

4. A belt according to claim 1, comprising more than two different cords having turns organized in alternation in the belt.

5. A belt according to claim 1, comprising a cord of polyester thread wound in alternation with a cord of aramid thread.

6. A belt according to claim 1, comprising a cord of polyester thread wound in alternation with a cord of polyamide thread.

7. A belt according to claim 5, wherein the cord of aramid thread is of the 1680×1×3 type.

8. A belt according to claim 7, wherein the cord of polyester thread is of the 1100×2×3 type.

9. A belt according to claim 7, wherein the cord of polyester thread is of the 1100×3×3 type.

10. A belt according to claim 6, wherein the cord of polyamide thread is of the 940×1×2 type.

11. A belt according to claim 10, wherein the cord of polyester thread is of the 1100×2×3 type.

12. A belt according to claim 10, wherein the cord of polyester thread is of the 1100×3×3 type.

* * * * *